United States Patent
Geva et al.

(10) Patent No.: US 10,568,203 B2
(45) Date of Patent: *Feb. 18, 2020

(54) MODIFYING A CIRCUIT DESIGN

(71) Applicant: International Business Machines Corporation, Armonk, NY (US)

(72) Inventors: Ofer Geva, Hod Hasharon (IL); Shiran Raz, Ganey Tikva (IL); Limor Elizov, Even-Yehuda (IL); Yaniv Maroz, Kiryat Ono (IL)

(73) Assignee: International Business Machines Corporation, Armonk, NY (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/615,859

(22) Filed: Jun. 7, 2017

(65) Prior Publication Data

US 2018/0359851 A1  Dec. 13, 2018

(51) Int. Cl.
*H05K 1/02* (2006.01)
*G06F 17/50* (2006.01)

(52) U.S. Cl.
CPC ....... *H05K 1/0292* (2013.01); *G06F 17/5045* (2013.01); *G06F 17/505* (2013.01); *G06F 17/5022* (2013.01); *G06F 17/5031* (2013.01); *G06F 2217/84* (2013.01)

(58) Field of Classification Search
CPC .............. H05K 1/0292; G06F 17/5022; G06F 17/5031; G06F 17/505; G06F 2217/84; G06F 17/5045
See application file for complete search history.

(56) References Cited

U.S. PATENT DOCUMENTS

| | | | |
|---|---|---|---|
| 6,526,543 B1 * | 2/2003 | Rosser | G06F 17/505 716/104 |
| 7,036,100 B2 * | 4/2006 | Tyler | G06F 17/5031 716/108 |
| 7,181,711 B2 * | 2/2007 | Foreman | G06F 17/5031 716/113 |
| 7,251,800 B2 | 7/2007 | McElvain | |

(Continued)

OTHER PUBLICATIONS

Held et al.; "Post-routing latch optimization for timing closure"; Year: 2014; 2014 51st ACM/EDAC/IEEE Design Automation Conference (DAC); pp. 1-6.*

(Continued)

*Primary Examiner* — Helen Rossoshek
(74) *Attorney, Agent, or Firm* — Joseph P. Curcuru; Gilbert Harmon, Jr.

(57) ABSTRACT

Embodiments describing an approach to detecting negative paths for a circuit design based on a circuit timing test of the circuit design. Assigning each negative path to a logic bucket, an integration bucket, or a macro bucket, wherein the logic bucket corresponds to logic design flaws, the integration bucket corresponds to integration design flaws, and the macro bucket corresponds to macro design flaws or design flaws residing within a macro of the circuit design. Detecting a modification to the circuit design based on the logic design flaws, the integration design flaws, and the macro design flaws, and applying the modification to the circuit design to enable manufacturing an integrated circuit, wherein an overall delay between two latches of the integrated circuit is below a predetermined threshold.

17 Claims, 7 Drawing Sheets

(56) References Cited

U.S. PATENT DOCUMENTS

| | | | | |
|---|---|---|---|---|
| 7,305,644 B2* | 12/2007 | Curtin | | G06F 17/5031 |
| | | | | 716/113 |
| 7,739,641 B1* | 6/2010 | Barnes | | G06F 1/10 |
| | | | | 716/113 |
| 7,743,355 B2* | 6/2010 | Zhou | | G06F 17/5031 |
| | | | | 370/238 |
| 7,761,832 B2* | 7/2010 | Alpert | | G06F 17/505 |
| | | | | 716/132 |
| 7,810,062 B2* | 10/2010 | Curtin | | G06F 17/5031 |
| | | | | 703/16 |
| 7,921,398 B2* | 4/2011 | Curtin | | G06F 17/5031 |
| | | | | 703/16 |
| 8,166,439 B2 | 4/2012 | Hopkins | | |
| 8,336,012 B2* | 12/2012 | Fry | | G06F 17/5045 |
| | | | | 703/19 |
| 8,516,418 B2 | 8/2013 | Singh | | |
| 8,527,920 B1* | 9/2013 | Choudhury | | G06F 17/505 |
| | | | | 716/104 |
| 8,621,403 B2 | 12/2013 | van Ginneken et al. | | |
| 8,732,642 B2 | 5/2014 | Visweswariah et al. | | |
| 8,776,000 B2* | 7/2014 | Chang | | G06F 17/5031 |
| | | | | 716/100 |
| 8,788,995 B1* | 7/2014 | Kumar | | G06F 17/5031 |
| | | | | 716/110 |
| 8,832,608 B1* | 9/2014 | Chakrabarty | | G06F 17/505 |
| | | | | 716/51 |
| 8,875,082 B1 | 10/2014 | Sircar | | |
| 9,026,970 B2 | 5/2015 | Danti | | |
| 9,223,920 B2 | 12/2015 | Su et al. | | |
| 9,400,866 B2 | 7/2016 | Lee et al. | | |
| 9,405,871 B1 | 8/2016 | Savithri et al. | | |
| 9,483,597 B1 | 11/2016 | Das et al. | | |
| 9,875,333 B1* | 1/2018 | Verma | | G06F 17/5031 |
| 9,898,564 B2* | 2/2018 | Chang | | G06F 17/5031 |
| 9,939,880 B1 | 4/2018 | Foreman | | |
| 2004/0243964 A1 | 12/2004 | McElvain et al. | | |
| 2008/0046850 A1* | 2/2008 | Curtin | | G06F 17/5031 |
| | | | | 716/113 |
| 2012/0079437 A1 | 3/2012 | Li et al. | | |
| 2014/0181779 A1* | 6/2014 | Cao | | G06F 17/505 |
| | | | | 716/134 |
| 2014/0298281 A1* | 10/2014 | Varadarajan | | G06F 17/5045 |
| | | | | 716/113 |
| 2015/0234968 A1* | 8/2015 | Boersma | | G06F 17/5045 |
| | | | | 716/102 |
| 2016/0216316 A1 | 7/2016 | Kim | | |
| 2017/0083658 A1 | 3/2017 | Haller et al. | | |
| 2018/0203956 A1* | 7/2018 | Ng | | G06F 17/505 |
| 2018/0247007 A1* | 8/2018 | Chen | | G06F 17/5077 |

OTHER PUBLICATIONS

Held, "Timing Closure in Chip Design", Dissertation, Jun. 2008, The Faculty of Mathematics and Natural Sciences, The Rheinische Friedrich-Wilhelms-Universität Bonn, 193 pages.

Mell et al., "The NIST Definition of Cloud Computing", National Institute of Standards and Technology, Special Publication 800-145, U.S. Department of Commerce, Computer Security Division, Sep. 2011, 7 pages.

Geva et al., "Modifying a Circuit Design", U.S. Appl. No. 15/848,048, filed Dec. 20, 2017, 29 pages.

IBM Appendix P, list of patents or patent applictions treated as related, filed herewith, 2 pages.

\* cited by examiner

US 10,568,203 B2

MODIFYING A CIRCUIT DESIGN

BACKGROUND OF THE INVENTION

The present disclosure relates to circuit designs, and more specifically, but not exclusively, to modifying a circuit design based on a type of design flaw.

SUMMARY

According to an embodiment described herein, embodiments of the present invention include a system for designing a circuit, comprising a processor that can detect negative paths for a circuit design based on a circuit timing test of the circuit design. The processor can also assign each negative path to a logic bucket, an integration bucket, and/or a macro bucket, wherein the logic bucket corresponds to logic design flaws, the integration bucket corresponds to integration design flaws, and the macro bucket corresponds to macro design flaws or design flaws residing within a macro of the circuit design. Additionally, the processor can detect a modification to the circuit design based on the logic design flaws, the integration design flaws, and the macro design flaws. Furthermore, the processor can apply the modification to the circuit design to enable the manufacturing of an integrated circuit, wherein an overall delay between two latches of the integrated circuit is below a predetermined threshold.

According to another embodiment, a method for modifying circuits can include detecting, by one or more processors, negative paths for a circuit design based on a circuit timing test of the circuit design. The method can also include assigning, by the one or more processors, each negative path to a logic bucket, an integration bucket, and/or a macro bucket, wherein the logic bucket corresponds to logic design flaws, the integration bucket corresponds to integration design flaws, and the macro bucket corresponds to macro design flaws or design flaws residing within a macro of the circuit design. Additionally, the method can include detecting, by the one or more processors, a modification to the circuit design based on the logic design flaws, the integration design flaws, and the macro design flaws and applying, by the one or more processors, the modification to the circuit design to enable manufacturing an integrated circuit, wherein an overall delay between two latches of the integrated circuit is below a predetermined threshold.

According to another embodiment, a computer program product for modifying a circuit design can include a computer readable storage medium having program instructions embodied therewith, wherein the computer readable storage medium is not a transitory signal per se. The program instructions can be executable by a processor to cause the processor to detect negative paths for a circuit design based on a circuit timing test of the circuit design. The program instructions can also be executable by the processor to cause the processor to assign each negative path to a logic bucket, an integration bucket, or a macro bucket, wherein the logic bucket corresponds to logic design flaws, the integration bucket corresponds to integration design flaws, and the macro bucket corresponds to macro design flaws or design flaws residing within a macro of the circuit design. Furthermore, the program instructions can be executable by the processor to cause the processor to detect a modification to the circuit design based on the logic design flaws, the integration design flaws, and the macro design flaws and apply the modification to the circuit design to enable manufacturing an integrated circuit, wherein an overall delay between two latches of the integrated circuit is below a predetermined threshold.

DETAILED DESCRIPTION

Figure 1:
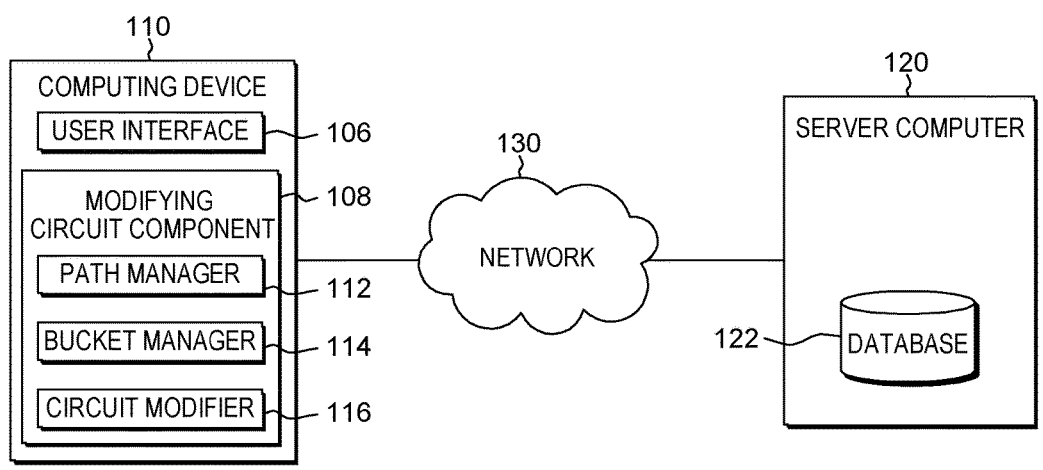
FIG. 1 depicts a block diagram of an example computing system that can modify a circuit design according to an embodiment described herein.

Static timing analysis (STA) is a technique for simulating the expected timing of a digital circuit without requiring a simulation of the full circuit. In some examples, high performance integrated circuits have traditionally been characterized by the clock frequency at which the integrated circuits operate. Determining the ability of a circuit to operate at a specified speed can include measuring, during the design process, the delay within the circuit. Moreover, delay calculation can be incorporated into the inner loop of timing optimizers at various phases of design, such as logic synthesis, layout (placement and routing), and in in-place optimizations performed late in the design cycle. Static timing analysis enables the fast and reasonably accurate measurement of circuit timing.

In some embodiments, the structure and behavior of electronic circuits and digital logic circuits can be described using a hardware description language (HDL). HDLs enable precise, formal descriptions of electronic circuits that allow for automated analysis and simulation. For example, the electronic circuits can include complex circuits such as application-specific integrated circuits (ASICs), microprocessors, and programmable logic devices (PLDs). HDLs are standard text-based expressions of the structure of electronic systems and their behavior over time. HDLs thus also include an explicit notion of time, which can be a primary attribute of hardware. For example, the Very High Speed Integrated Circuit (VHSIC) Hardware Description Language (VHDL) is an HDL used in electronic design automation to describe digital and mixed-signal systems such as field-programmable gate arrays and integrated circuits. A macro written in VHDL can include multiple design abstractions organized as a hierarchy. For example, a higher level of a hierarchy can be a register-transfer level (RTL). An RTL can be used to model a synchronous digital circuit in terms of the flow of digital signals (i.e., data) between hardware registers, and the logical operations performed on those signals. In some embodiments, lower-level representations and ultimately actual wiring can be derived from higher level representations.

In some embodiments described herein, a device for designing a circuit can detect negative paths for a circuit design based on a circuit timing test of the circuit design, in which improves the art by enabling the diagnosis of broken logic in early stages of a project. In some examples, the slack associated with each path in a circuit is the difference between the required delay time of an electrical signal using the path and the estimated or actual arrival time of an electrical signal using the path. In various embodiments, a positive slack or positive path indicates that the arrival time at a gate or node in a circuit can be increased without affecting the overall delay of the circuit. Conversely, in various embodiments, negative slack implies that a path of a circuit is too slow, and the path can be sped up (or the reference signal delayed) if the whole circuit is to work at a desired speed. A path with negative slack is referred to herein as a negative path.

In some embodiments, the device can also assign each negative path to a logic bucket, an integration bucket, or a macro bucket, wherein the logic bucket, the integration bucket, and the macro bucket correspond to different design flaws such as logic design flaws, integration design flaws, and macro design flaws. Additionally, the device can detect a modification to the circuit design based on the different design flaws and apply the modification to the circuit design to enable manufacturing an integrated circuit, wherein an overall delay between two latches of the integrated circuit is below a predetermined threshold, improving the art. Accordingly, the techniques described herein can reduce latency in a circuit or a system on a chip.

With reference now to FIG. 1, an example computing device is depicted that can modify a circuit. FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments can be implemented. Many modifications to the depicted environment can be made by those skilled in the art without departing from the scope of the invention as recited by the claims.

Computing device 110 can be, for example, a server, desktop computer, laptop computer, tablet computer, or smartphone. In some examples, computing device 110 can be a cloud computing node. Computing device 110 can be described in the general context of computer system executable instructions, such as program modules, being executed by a computer system. Generally, program modules can include routines, programs, objects, components, logic, data structures, and so on that perform particular tasks or implement particular abstract data types. Computing device 110 can be practiced in distributed cloud computing environments where tasks are performed by remote processing devices that are linked through a communications network. In a distributed cloud computing environment, program modules can be located in both local and remote computer system storage media including memory storage devices. In various embodiments, computing device 110 can include and/or be integrated with the elements of FIG. 7.

Distributed data processing environment 100 includes computing device 110 and server computer 120, interconnected over network 130. Network 130 can be, for example, a telecommunications network, a local area network (LAN), a wide area network (WAN), such as the Internet, or a combination of the three, and can include wired, wireless, or fiber optic connections. Network 130 can include one or more wired and/or wireless networks that are capable of receiving and transmitting data, voice, and/or video signals, including multimedia signals that include voice, data, and video information. In general, network 130 can be any combination of connections and protocols that will support communications between computing device 110 and server computer 120, and other computing devices (not shown in FIG. 1) within distributed data processing environment 100. In various embodiments, computing device 110 can include user interface 106, and/or user interface 106. In other embodiments, not depicted in FIG. 1, can include a database and/or a local storage.

In various embodiments, computing device 110 can be, but is not limited to, a standalone device, a server, a laptop computer, a tablet computer, a netbook computer, a personal computer (PC), a smart phone, a desktop computer, a smart television, a smart watch, any programmable electronic computing device capable of communicating with various components and devices within distributed data processing environment 100, via network 102 or any combination therein. In general, computing device 110 are representative of any programmable mobile device or a combination of programmable mobile devices capable of executing machine-readable program instructions and communicating with users of other mobile devices via network 130 and or capable of executing machine-readable program instructions and communicating with server computer 120. In other embodiments, computing device 110 can represent any programmable electronic computing device or combination of programmable electronic computing devices capable of executing machine readable program instructions, manipulating executable machine readable instructions, and communicating with server computer 120 and other computing devices (not shown) within distributed data processing environment 100 via a network, such as network 130. Computing device 110 includes an instance of user interface 106. Computing device 110 and user interface 106 allow a user to interact with modifying circuit component 108 in various ways, such as sending program instructions, receiving messages, sending data, inputting data, editing data, correcting data and/or receiving data. Server computer 120 may include internal and external hardware components, as depicted and described in further detail with respect to FIG. 7.

In various embodiments, user interface 106 can provide an interface to modifying circuit component 108 on server computer 120 for a user of computing device 110. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of computing device 110 and server computer 120. Mobile application software, or an "app," is a computer program designed to run on smart phones, tablet computers and other mobile devices. In an embodiment, user interface 106 enables the user of computing device 110 to send data, input data, edit data, correct data and/or receive data.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any other programmable electronic device capable of communicating with computing device 110 and other computing devices (not shown) within distributed data processing environment 100 via network 130. In another embodiment, server computer 120 represents a computing system utilizing clustered computers and components (e.g., database server computers, application server computers, etc.) that act as a single pool of seamless resources when accessed within distributed data processing environment 100. Server computer 120 may include internal and external hardware components, as depicted and described in further detail with respect to FIG. 7.

Database 122 can be a data repository and/or a database that may be written to and read by one or a combination of server computer 120 and/or computing device 110. In the depicted embodiment, database 122 resides on server computer 120. In another embodiment, database 122 may reside elsewhere within distributed data processing environment 100 modifying circuit component 108 has access to database 122. A database is an organized collection of data. Database 122 can be implemented with any type of storage device capable of storing data and configuration files that can be accessed and utilized by server computer 120, such as a database server, a hard disk drive, or a flash memory. Database 122 stores coverage data of a user. In other embodiments, database 122 can be hard drives, memory cards, computer output to laser disc (cold storage), and or any form of data storage known in the art.

In the exemplary embodiment, modifying circuit component 108 is housed on computing device 110; however, in other embodiments, modifying circuit component 108 can be housed on server computer 120, network 130, and/or another computing device not shown in environment 100. In various embodiments, modifying circuit component 108 can include subcomponents path manager 112, bucket manager 114, and/or circuit modifier 116. In some embodiments, path manager 112 can detect negative paths for a circuit design based on a circuit timing test of the circuit design. In some embodiments, bucket manager 114 can assign each negative path to a logic bucket, an integration bucket, and/or a macro bucket, wherein the logic bucket corresponds to logic design flaws, the integration bucket corresponds to integration design flaws, and the macro bucket corresponds to macro design flaws or design flaws residing within a macro of the circuit design. In some embodiments, circuit modifier 116 can detect a modification to the circuit design based on the logic design flaws, the integration design flaws, and the macro design flaws. Circuit modifier 116 can also apply the modification to the circuit design to enable manufacturing an integrated circuit, wherein an overall delay between two latches of the integrated circuit is below a predetermined threshold.

It is to be understood that the block diagram of FIG. 1 is not intended to indicate that computing device 110 is to include all of the components shown in FIG. 1. Rather, computing device 110 can include fewer or additional components not illustrated in FIG. 1 (e.g., additional memory components, embedded controllers, modules, additional network interfaces, etc.). Furthermore, any of the functionalities of path manager 112, bucket manager 114, and circuit modifier 116 can be partially, or entirely, implemented in hardware and/or in the processors. For example, the functionality can be implemented with an application specific integrated circuit, logic implemented in an embedded controller, or in logic implemented in the processors, among others. In some embodiments, the functionalities of path manager 112, bucket manager 114, and circuit modifier 116 can be implemented with logic, wherein the logic, as referred to herein, can include any suitable hardware (e.g., a processor, among others), software (e.g., an application, among others), firmware, or any suitable combination of hardware, software, and firmware.

Figure 2:
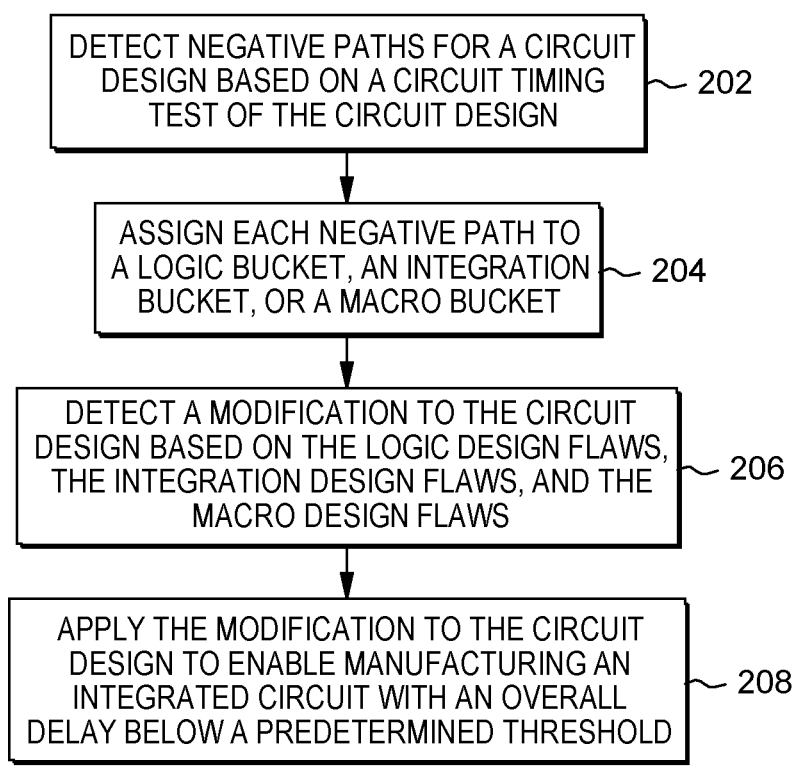
FIG. 2 is a process flow diagram of an example method that can modify a circuit design according to an embodiment described herein.

FIG. 2 is a process flow diagram of an example method that can modify a circuit. The method 200 can be implemented with any suitable computing device, such as computing device 110 of FIG. 1. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step 202, path manager 112 can detect negative paths for a circuit design based on a circuit timing test of the circuit design. For example, as discussed above, the slack associated with each path in a circuit can be measured as the difference between the required range of time for the path to transmit an electrical signal and the estimated arrival time of an electrical signal using the path. In some examples, the estimated arrival time is based on a simulation or circuit timing test of the circuit. A positive slack implies that the arrival time at a gate or node in the circuit can be increased without affecting the overall delay of the circuit. Conversely, negative slack implies that a path is too slow, and the path can be sped up (or the reference signal delayed) if the whole circuit is to work at a desired speed. A path with negative slack is referred to herein as a negative path. In some examples, path manager 112 can store the negative paths for a circuit in any suitable abstract data type, database, or file, among others. Path manager 112 can also group negative paths based on macros or regions within a circuit. A macro, as referred to herein, can include a sub-division of a circuit based on related logic that performs a common task. For example, a macro can include logic performing an adder calculation, or logic performing address generation, among others. In some examples, path manager 112 can group negative paths located proximate one another into a first set and negative paths located more than a predetermined distance from the first set can be stored as a second set. In some embodiments, path manager 112 can use circuit timing tests that identify negative paths in any suitable number of regions or macros of an integrated circuit, which can be a processor, a system on a chip, and the like.

At step 204, bucket manager 114 can assign each negative path to a logic bucket, an integration bucket, or a macro bucket, wherein the logic bucket, the integration bucket, and the macro bucket correspond to macro design flaws or design flaws residing within a macro of the circuit. A logic bucket, as referred to herein, can indicate a logic design flaw in a circuit corresponding to gate delay times exceeding a cycle time for the circuit or gate delays in addition to an optimal integration delay exceeding a cycle time for the circuit. An integration bucket, as referred to herein, can indicate macro design flaws such as macros being too far apart, and wire delay issues, among other integration design flaws. In some examples, the integration bucket indicates integration design flaws based on a Manhattan distance of two gates in a circuit. A macro bucket, as referred to herein, can indicate macro design flaws within a single macro such as wires that exceed a necessary length, buffers that exceed a necessary size, and the like. In some examples, the macro bucket can indicate macro design flaws corresponding to adders, dividers, and the like. For example, the macro bucket can indicate macro design flaws corresponding to multiple gates within a macro of a circuit design. In some embodiments, a macro bucket can indicate that a ratio of a best case delay time to an actual or estimated delay time exceeds a predetermined ratio. In some examples, the macro design flaw corresponds to an actual virtual time that exceeds a best case time by a threshold time delay amount.

In some embodiments, bucket manager 114 can indicate a logic design flaw based on a zero wire length tool that eliminates wire delay. The zero wire length tool can isolate logic delay associated with gates and latches to provide a best case time for a macro without a wire delay. In various embodiments, a latch, as referred to herein, includes a circuit with two stable states that can be used to store state information. In some examples, bucket manager 114 can include the wire delay if macros being analyzed are located in different partitions of an integrated circuit or processing core. In some embodiments, bucket manager 114 can detect a priority of logic design flaws in the logic bucket, integrations design flaws in the integration bucket, and macro design flaws in the macro bucket, and assign each negative path to the logic bucket, the integration bucket, and the macro bucket based on the priority. The prioritization of design flaws is discussed below in relation to step 206.

At step 206, circuit modifier 116 can detect a modification to the circuit design based on the different design flaw. In some embodiments, circuit modifier 116 can detect modifications to multiple aspects of a circuit and detect a priority for each of the design flaws. For example, circuit modifier 116 can detect design flaws in a logic bucket, an integration bucket, and a macro bucket, or any combination thereof. Circuit modifier 116 can apply modifications to the circuit to prevent logic design flaws prior to applying modifications to the circuit to prevent integration or macro design flaws. In some examples, circuit modifier 116 can also apply a modification to correct for an integration design flaw in parallel with correcting a macro design flaw. Although, circuit modifier 116 can apply a modification to correct a macro design flaw prior to correcting an integration design flaw if a high slew time of a path is above a predetermined slew threshold.

At step 208, circuit modifier 116 can apply the modification to the circuit design to enable manufacturing an integrated circuit, wherein an overall delay between two latches of the integrated circuit is below a predetermined threshold. For example, circuit modifier 116 can modify a simulation of a circuit or a manufacturing of a circuit based on the identified modifications that correct for logic design flaws, macro design flaws, and integration design flaws. In some embodiments, circuit modifier 116 can transmit instructions to an automated manufacturing device to manufacture a circuit with fewer negative paths, which can reduce latency in the circuit.

The process flow diagram of FIG. 2 is not intended to indicate that the operations of the method 200 are to be executed in any particular order, or that all of the operations of the method 200 are to be included in every case. For example, bucket manager 114 can detect any number of negative paths for a circuit and process the negative paths in any suitable order.

Figure 3:
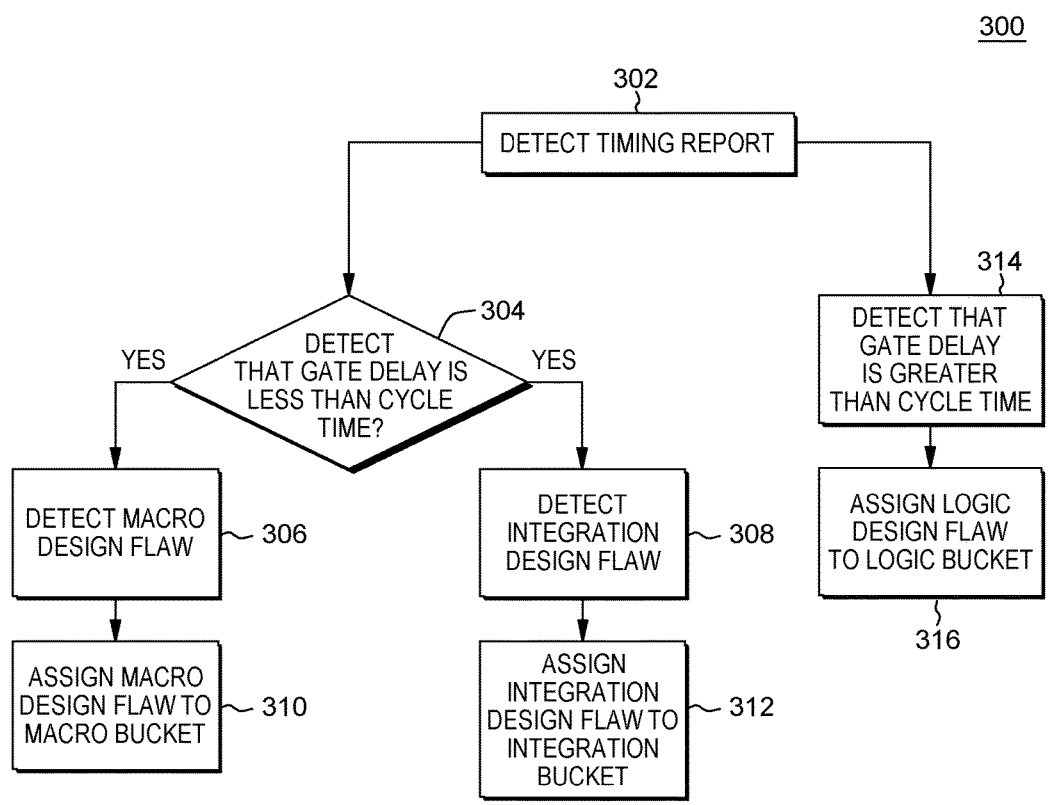
FIG. 3 is a process flow diagram for assigning design flaws to a logic bucket, an integration bucket, or a macro bucket.

FIG. 3 is a process flow diagram of an example method that can assign design flaws to a logic bucket, an integration bucket, or a macro bucket. The method 300 can be implemented with any suitable computing device, such as computing device 110 of FIG. 1. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

At step 302, path manager 112 can detect a timing report. In some embodiments, the timing report can indicate timing delays for any number of paths in an integrated circuit design. In some examples, the timing report can be provided by a remote device to a cloud service that executes path manager 112. In other embodiments, path manager 112 can detect the timing report on a local computing device. In some examples, the timing report can indicate an estimated time to transmit an electrical signal within a macro, or between multiple macros and multiple gates, among others.

At step 304, bucket manager can detect if the gate delay for a negative path, in addition to an optimal integration delay, is less than a cycle time. The optimal integration delay can indicate a best case amount of delay to transmit an electrical signal between two macros of a circuit. If so, the process continues at steps 306 and 308.

At step 306, bucket manager can detect a macro design flaw in the negative path. For example, the macro design flaw can indicate delays in wires, assertions, pinning, and placement of a macro in a circuit. In some embodiments, the macro design flaw can indicate than an output pin of a macro is in a location that increases the amount of time to transmit an electrical signal beyond a threshold value. The macro design flaw can also indicate that a path inside of a macro has a weak gate with a small number of transistors corresponding to a high load. Accordingly, the macro design flaw can indicate that the amount of time for the weak gate with a small number of transistors to transmit a signal exceeds a threshold value.

At step 310, bucket manager can assign the macro design flaw to a macro bucket. In some examples, the macro bucket can indicate a group of users, software tools, and the like, which can correct the macro design flaw. For example, the macro bucket can indicate that a stronger gate with additional transistors is needed in a macro to process a high load. Accordingly, a macro can be redesigned with additional transistors to process a high load electrical signal.

At step 308, bucket manager can detect an integration design flaw. For example, the integration design flaw can correspond to a distance associated with two gates or latches, among other integration design flaws. In some embodiments, the integration design flaw can indicate a buffer delay issue in which a repeater is too weak to transmit an electrical signal across a distance between two gates or latches. In some examples, the integration design flaw can also indicate that an electrical signal is to be transmitted via a wire at a higher level to increase the speed at which the electrical signal is transmitted between two gates or latches.

At step 312, bucket manager can assign the integration design flaw to an integration bucket. In some embodiments, the integration bucket can indicate a group of users or software tools that can correct the integration design flaw. For example, the integration bucket can indicate that a low power repeater is to be replaced with a high power repeater, or an electrical signal is to be transmitted through a different wire at a higher level, among others.

Returning to step 302, the process can continue at step 314 by detecting that a gate delay of a negative path is greater than a cycle time or that a gate delay of a negative path in a macro plus an optimal integration delay is greater than a cycle time. The gate delay exceeding the cycle time can indicate a logic design flaw as described above. For example, the logic design flaw can indicate that a sum delay for gates between two latches exceeds a cycle time or a cycle time threshold. In some examples, a circuit can include a driving latch that transmits an electrical signal to a receiving latch. The circuit can include any number of NAND gates, XOR gates, NOR gates, OR gates, among other gates, between the driving latch and the receiving latch. In some embodiments, the logic design flaw can indicate that the sum delay of the gates between the driving latch and the receiving latch exceeds a cycle time.

At step 316, bucket manager can assign the logic design flaw to a logic bucket. In some embodiments, the logic bucket can indicate a group of users or software tools that can correct the logic design flaw. For example, the logic bucket can indicate that a circuit is to include fewer gates between two latches, or that different gates are to be included between two latches, among others. In some embodiments, the logic design flaw can be tested iteratively by removing a single gate between two latches and determining if the gate delay is still greater than a cycle time of the circuit. The testing can be repeated until the number of gates between two latches results in transmission of an electrical signal with a delay less than a cycle time of the circuit.

The process flow diagram of FIG. 3 is not intended to indicate that the operations of the method 300 are to be executed in any particular order, or that all of the operations of the method 300 are to be included in every case. In some embodiments, bucket manager can execute steps 304 and 314 simultaneously to identify logic design flaws and macro design flaws or integration design flaws in parallel. In some embodiments, circuit design specialists or machine learning techniques can be used to detect the macro design flaws, integration design flaws, and logic design flaws.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical functions. In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
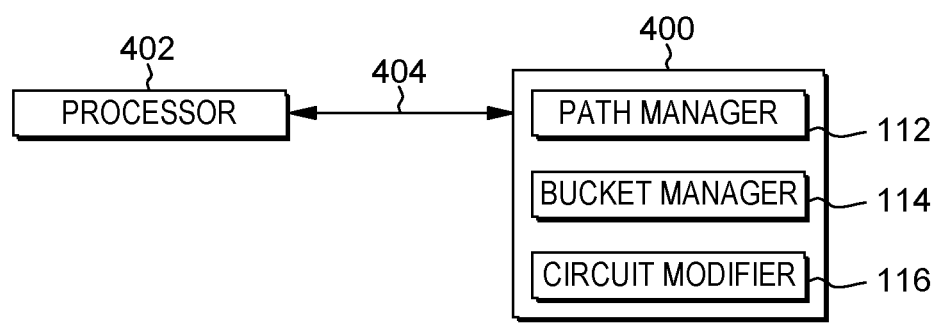
FIG. 4 is a tangible, non-transitory computer-readable medium that can modify a circuit design according to an embodiment described herein.

Referring now to FIG. 4, a block diagram is depicted of an example of a tangible, non-transitory computer-readable medium that can modify a circuit design. The tangible, non-transitory, computer-readable medium 400 can be accessed by a processor 402 over a computer interconnect 404. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Furthermore, the tangible, non-transitory, computer-readable medium 400 can include code to direct the processor 402 to perform the operations of the current method, and house modifying circuit component 108, and modifying circuit component 108 subcomponents. In the exemplary embodiment, modifying circuit component 108 subcomponents are housed on computer-readable medium 400. For example, path manager 112 can detect negative paths for a circuit design based on a circuit timing test of the circuit design. In some embodiments, bucket manager 114 can assign each negative path to a logic bucket, an integration bucket, or a macro bucket, wherein the logic bucket corresponds to logic design flaws, the integration bucket corresponds to integration design flaws, and the macro bucket corresponds to macro design flaws or design flaws residing within a macro of the circuit design. In some embodiments, circuit modifier 116 can detect a modification to the circuit design based on the logic design flaws, the integration design flaws, and the macro design flaws. Circuit modifier 116 can also apply the modification to the circuit design to enable manufacturing an integrated circuit, wherein an overall delay between two latches of the integrated circuit is below a predetermined threshold.

It is to be understood that any number of additional software components not shown in FIG. 4 can be included within the tangible, non-transitory, computer-readable medium 400, depending on the specific application. Furthermore, fewer software components than those shown in FIG. 4 can be included in the tangible, non-transitory, computer-readable medium 400.

Figure 5:
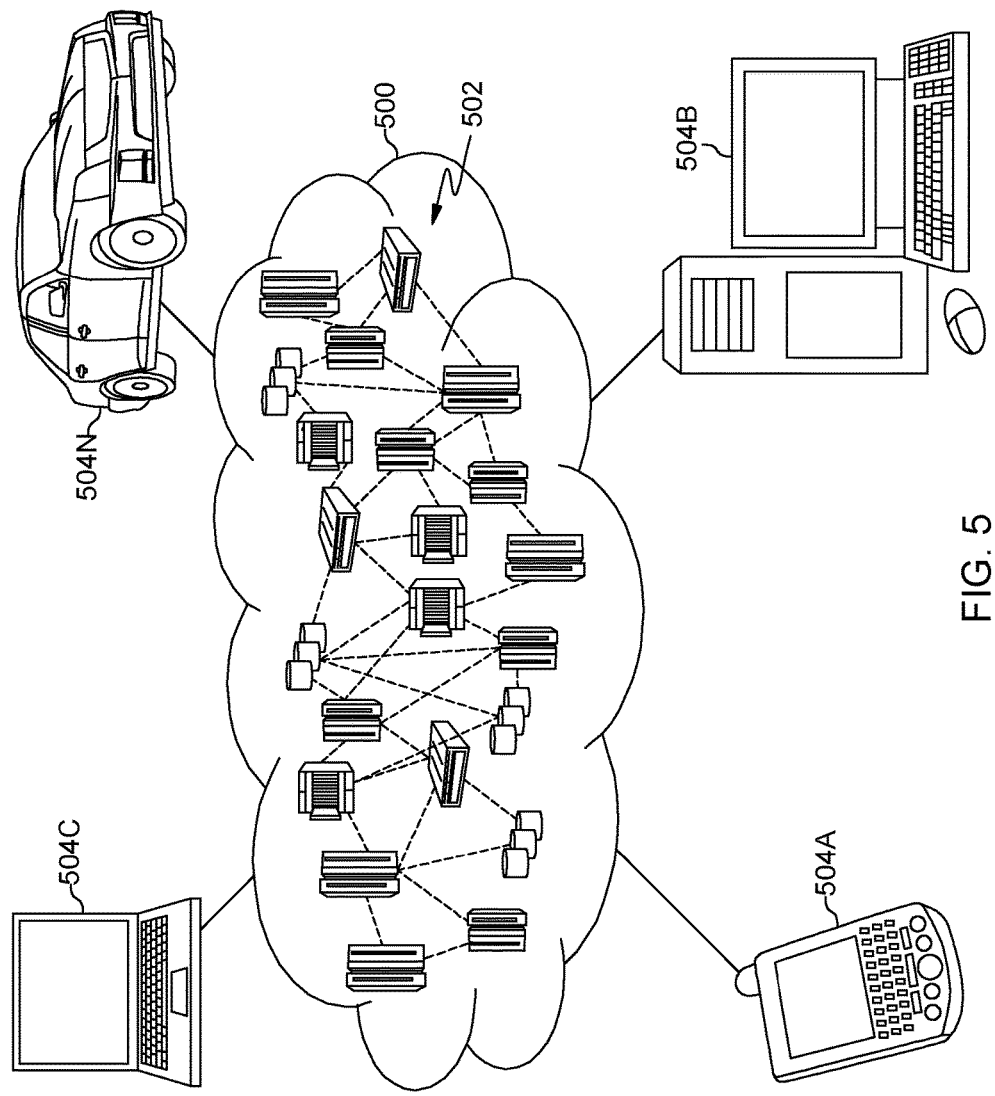
FIG. 5 depicts an illustrative cloud computing environment according to an embodiment described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N can communicate. Nodes 502 can communicate with one another. They can be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
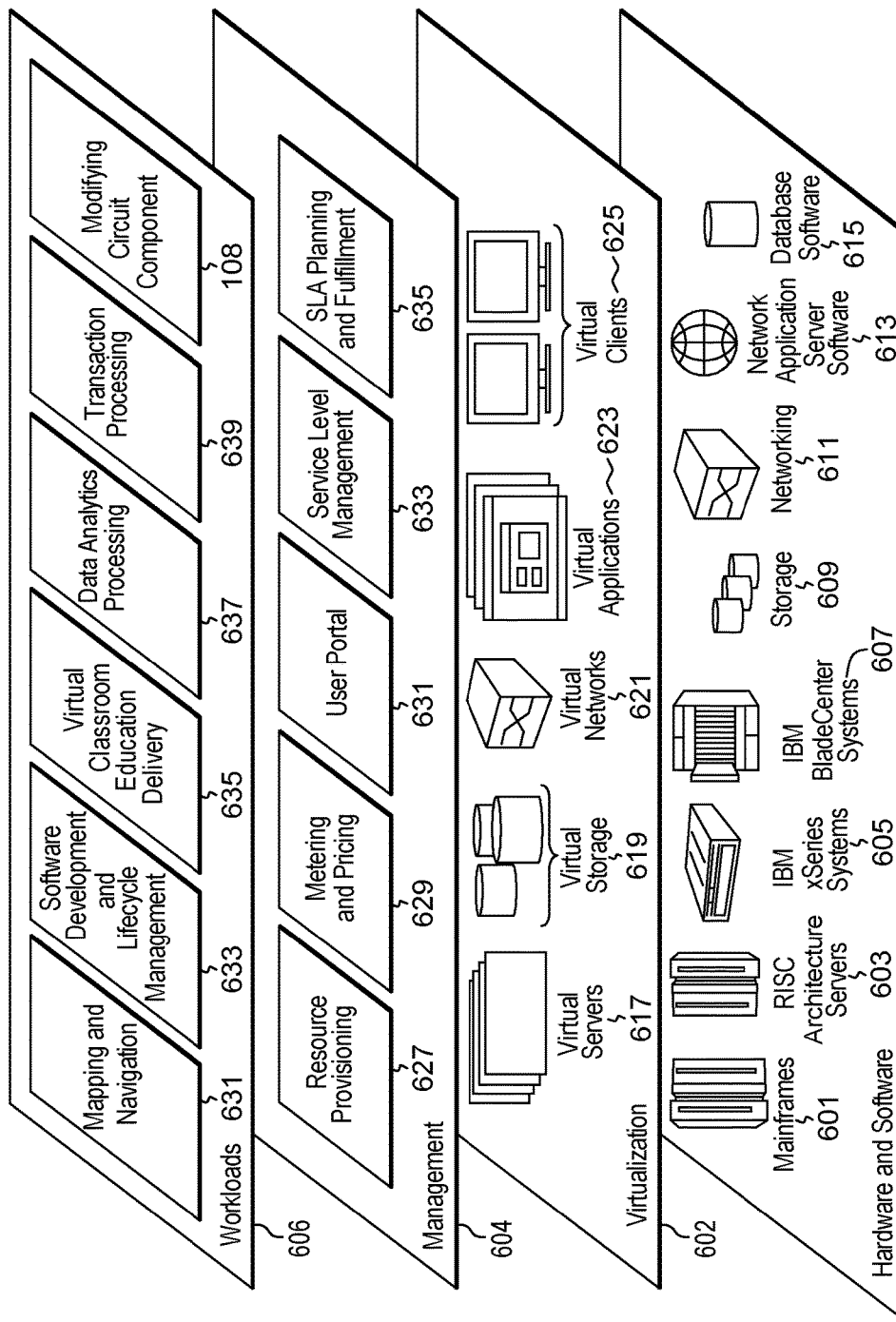
FIG. 6 depicts a set of functional abstraction layers provided by a cloud computing environment according to an embodiment described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes 601, in one example IBM® zSeries® systems; RISC (Reduced Instruction Set Computer) architecture based servers 603, in one example IBM pSeries® systems; servers 605, in one example IBM xSeries® systems; blade servers 607, in one example IBM BladeCenter® systems; storage devices 609; networks and networking components 611. Examples of software components include network application server software 613, in one example IBM WebSphere® application server software; and database software 615, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities can be provided: virtual servers 617; virtual storage 619; virtual networks 621, including virtual private networks; virtual applications and operating systems 623; and virtual clients 625.

In one example, management layer 604 can provide the functions described below. Resource provisioning 627 provides dynamic procurement of computing resources and other resources that are utilized to perform tasks within the cloud computing environment. Metering and Pricing 629 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 631 provides access to the cloud computing environment for consumers and system administrators. Service level management 633 provides cloud computing resource allocation and management such that required service levels are met. Service Level Agreement (SLA) planning and fulfillment 635 provide pre-arrangement for, and procurement of, cloud computing resources for which a future requirement is anticipated in accordance with an SLA.

Workloads layer 606 provides examples of functionality for which the cloud computing environment can be utilized. Examples of workloads and functions which can be provided from this layer include: mapping and navigation 631; software development and lifecycle management 633; virtual classroom education delivery 635; data analytics processing 637; transaction processing 639; and modifying circuit component 108 based on design flaws in a logic bucket, macro bucket, or integration bucket. In various embodiments, modifying circuit component 108 can include modifying subcomponents path manager 112, bucket manager 114, and/or circuit modifier 116.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 7:
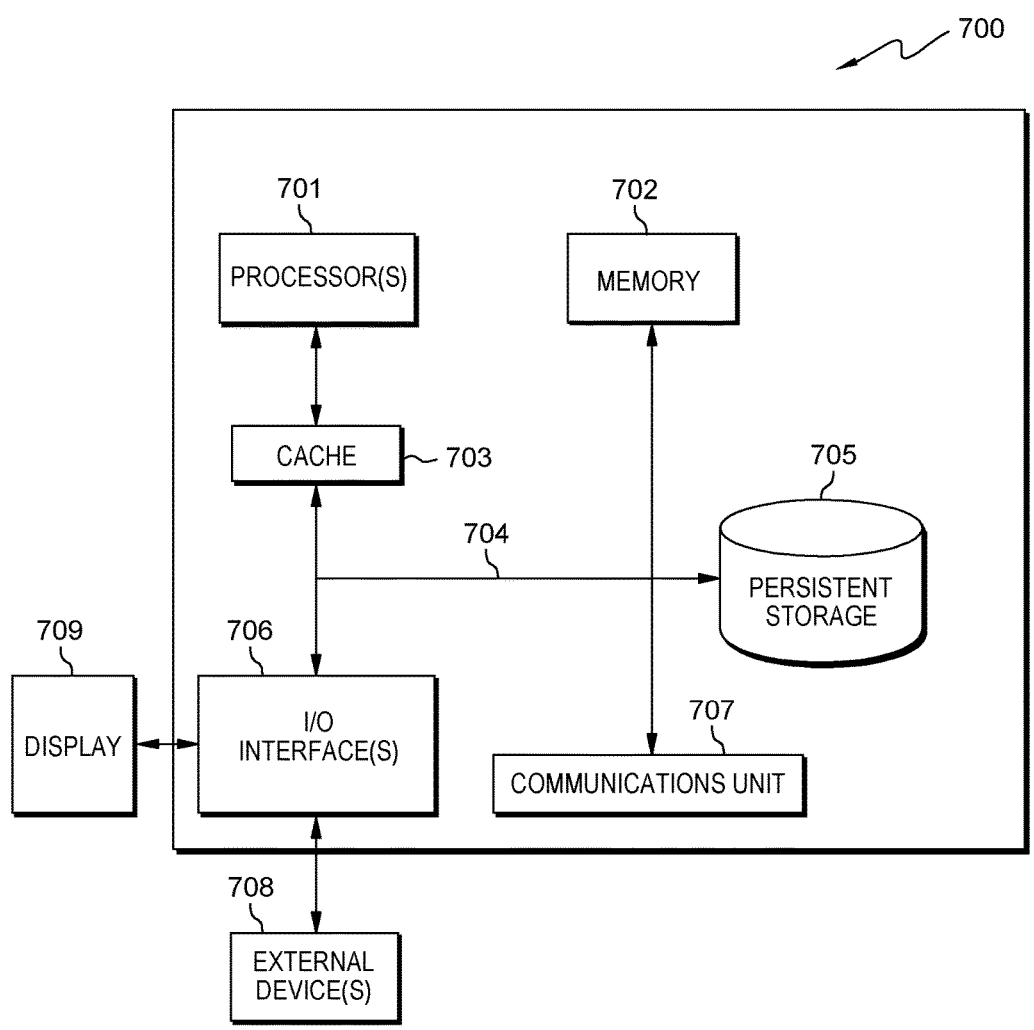
FIG. 7 depicts a block diagram of components of the server computer executing the intelligent mapping program within the distributed data processing environment of FIG. 1, in accordance with an embodiment of the present invention.

FIG. 7 depicts a block diagram of components of a computing device within distributed data processing environment 100 of FIG. 1, in accordance with an embodiment of the present invention. It should be appreciated that FIG. 7 provides only an illustration of one implementation and does not imply any limitations with regard to the environments in which different embodiments can be implemented. Many modifications to the depicted environment can be made.

FIG. 7 depicts computer system 700, where server computer 120 represents an example of computer system 700 that includes cognitive health and nutrition advisor. The computer system includes processors 701, cache 703, memory 702, persistent storage 705, communications unit 707, input/output (I/O) interface(s) 706 and communications fabric 704. Communications fabric 704 provides communications between cache 703, memory 702, persistent storage 705, communications unit 707, and input/output (I/O) interface(s) 706. Communications fabric 704 can be implemented with any architecture designed for passing data and/or control information between processors (such as microprocessors, communications and network processors, etc.), system memory, peripheral devices, and any other hardware components within a system. For example, communications fabric 704 can be implemented with one or more buses or a crossbar switch.

Memory 702 and persistent storage 705 are computer readable storage media. In this embodiment, memory 702 includes random access memory (RAM). In general, memory 702 can include any suitable volatile or non-volatile computer readable storage media. Cache 703 is a fast memory that enhances the performance of processors 701 by holding recently accessed data, and data near recently accessed data, from memory 702.

Program instructions and data used to practice embodiments of the present invention may be stored in persistent storage 705 and in memory 702 for execution by one or more of the respective processors 701 via cache 703. In an embodiment, persistent storage 705 includes a magnetic hard disk drive. Alternatively, or in addition to a magnetic hard disk drive, persistent storage 705 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 705 may also be removable. For example, a removable hard drive may be used for persistent storage 705. Other examples include optical and magnetic disks, thumb drives, and smart cards that are inserted into a drive for transfer onto another computer readable storage medium that is also part of persistent storage 705.

Communications unit 707, in these examples, provides for communications with other data processing systems or devices. In these examples, communications unit 707 includes one or more network interface cards. Communications unit 707 may provide communications through the use of either or both physical and wireless communications links. Program instructions and data used to practice embodiments of the present invention may be downloaded to persistent storage 705 through communications unit 707.

I/O interface(s) 706 enables for input and output of data with other devices that may be connected to each computer system. For example, I/O interface 706 may provide a connection to external devices 708 such as a keyboard, keypad, a touch screen, and/or some other suitable input device. External devices 708 can also include portable computer readable storage media such as, for example, thumb drives, portable optical or magnetic disks, and memory cards. Software and data used to practice embodiments of the present invention can be stored on such portable computer readable storage media and can be loaded onto persistent storage 705 via I/O interface(s) 706. I/O interface(s) 706 also connect to display 709.

Display 709 provides a mechanism to display data to a user and may be, for example, a computer monitor.

What is claimed is:

1. A system for designing a circuit comprising:
a processor to:
detect negative paths for a circuit design based on a circuit timing test of the circuit design, wherein the negative paths correspond to at least one of logic design flaws, integration design flaws or macro design flaws;
detect a priority of the logic design flaws, the integration design flaws, and the macro design flaws;
assign the negative paths to a logic bucket, an integration bucket, or a macro bucket based on the priority, wherein the logic bucket corresponds to the logic design flaws, the integration bucket corresponds to the integration design flaws, and the macro bucket corresponds to the macro design flaws and design flaws residing within a macro of the circuit design;
detect a modification to the circuit design based on the logic design flaws, the integration design flaws, and the macro design flaws; and apply the modification to the circuit design to enable manufacturing of an integrated circuit, wherein an overall delay between two latches of the integrated circuit is below a predetermined threshold.

2. The system of claim 1, wherein the priority indicates that the logic design flaws corresponding to the logic bucket are to be resolved prior to the integration design flaws or the macro design flaws.

3. The system of claim 1, wherein the priority indicates that integration design flaws are to be resolved in parallel with macro design flaws.

4. The system of claim 3, wherein the integration design flaws correspond to a wire delay issue or a buffer delay issue.

5. The system of claim 3, wherein the macro design flaws correspond to an actual virtual time that exceeds a best case time by a threshold time delay amount.

6. The system of claim 1, wherein the priority indicates that the macro design flaws are to be resolved prior to integration design flaws in response to detecting a high slew time.

7. A method for modifying circuits comprising:
  detecting, by one or more processors, negative paths for a circuit design based on a circuit timing test of the circuit design, wherein the negative paths correspond to at least one of logic design flaws, integration design flaws or macro design flaws;
  detecting, by the one or more processors, a priority of the logic design flaws, the integration design flaws, and the macro design flaws;
  assigning, by the one or more processors, the negative paths to a logic bucket, an integration bucket, or a macro bucket based on the priority, wherein the logic bucket corresponds to the logic design flaws, the integration bucket corresponds to the integration design flaws, and the macro bucket corresponds to the macro design flaws and design flaws residing within a macro of the circuit design;
  detecting, by the one or more processors, a modification to the circuit design based on the logic design flaws, the integration design flaws, and the macro design flaws; and
  applying, by the one or more processors, the modification to the circuit design to enable manufacturing of an integrated circuit, wherein an overall delay between two latches of the integrated circuit is below a predetermined threshold.

8. The method of claim 7, wherein the priority indicates that logic design flaws corresponding to the logic bucket are to be resolved prior to the integration design flaws or the macro design flaws.

9. The method of claim 7, wherein the priority indicates that integration design flaws are to be resolved in parallel with macro design flaws.

10. The method of claim 9, wherein the integration design flaws correspond to a wire delay issue or a buffer delay issue.

11. The method of claim 9, wherein the macro design flaws correspond to an actual virtual time that exceeds a best case time by a threshold time delay amount.

12. The method of claim 7, wherein the priority indicates that the macro design flaws are to be resolved prior to the integration design flaws in response to detecting a high slew time.

13. A computer program product for modifying circuits, the computer program product comprising a computer readable storage medium having program instructions embodied therewith, wherein the computer readable storage medium is not a transitory signal per se, the program instructions executable by a processor, to cause the processor to:
  detect negative paths for a circuit design based on a circuit timing test of the circuit design, wherein the negative paths correspond to at least one of logic design flaws, integration design flaws or macro design flaws;
  detect a priority of the logic design flaws, the integration design flaws, and the macro design flaws;
  assign each the negative paths to a logic bucket, an integration bucket, or a macro bucket based on the priority, wherein the logic bucket corresponds to the logic design flaws, the integration bucket corresponds to the integration design flaws, and the macro bucket corresponds to the macro design flaws or and design flaws residing within a macro of the circuit design;
  detect a modification to the circuit design based on the logic design flaws, the integration design flaws, and the macro design flaws; and
  apply the modification to the circuit design to enable manufacturing of an integrated circuit, wherein an overall delay between two latches of the integrated circuit is below a predetermined threshold.

14. The computer program product of claim 13, wherein the priority indicates that logic design flaws corresponding to the logic bucket are to be resolved prior to the integration design flaws or the macro design flaws.

15. The computer program product of claim 13, wherein the priority indicates that the integration design flaws are to be resolved in parallel with the macro design flaws.

16. The computer program product of claim 15, wherein the integration design flaws correspond to a wire delay issue or a buffer delay issue.

17. The computer program product of claim 15, wherein the macro design flaws correspond to an actual virtual time that exceeds a best case time by a threshold time delay amount.

* * * * *